US007633866B2

(12) United States Patent
Han et al.

(10) Patent No.: US 7,633,866 B2
(45) Date of Patent: Dec. 15, 2009

(54) DATA TRANSMISSION SYSTEM AND METHOD IN EPON, AND RECORDING MEDIUM STORING PROGRAM OF THE SAME

(75) Inventors: Kyeong-Soo Han, Daejeon (KR);
Tae-Whan Yoo, Daejeon (KR);
Hyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 846 days.

(21) Appl. No.: 10/732,143

(22) Filed: Dec. 10, 2003

(65) Prior Publication Data

US 2004/0141745 A1 Jul. 22, 2004

(30) Foreign Application Priority Data

Dec. 24, 2002 (KR) ............... 10-2002-0083718
Mar. 7, 2003 (KR) ............... 10-2003-0014425

(51) Int. Cl.
*H04L 12/66* (2006.01)
*H04B 10/20* (2006.01)
(52) U.S. Cl. ............... 370/230.1; 370/463; 398/58
(58) Field of Classification Search ...... 370/229–230.1, 370/235, 458, 462–463, 468, 498, 503; 398/43, 398/52, 58
See application file for complete search history.

(56) References Cited

U.S. PATENT DOCUMENTS

2002/0085552 A1 7/2002 Tandon

2002/0118683 A1 8/2002 Narayana et al.
2002/0136203 A1 9/2002 Liva et al.
2005/0249498 A1* 11/2005 Haran et al. ............... 398/58

FOREIGN PATENT DOCUMENTS

| EP | 1311137 A2 * | 5/2003 |
| JP | 10-145386 | 5/1998 |
| JP | 2000-332808 | 11/2000 |
| WO | WO03/017545 A1 * | 2/2003 |

OTHER PUBLICATIONS

Kramer, G.; Pesavento, G.; Ethernet passive optical network (EPON): building a next-generation optical access network, Communications Magazine, IEEE, vol. 40, Iss.2, Feb. 2002, pp. 66-73.*

(Continued)

*Primary Examiner*—Aung S Moe
*Assistant Examiner*—Kerri M Rose
(74) *Attorney, Agent, or Firm*—Blakely, Sokoloff, Taylor & Zafman LLP

(57) ABSTRACT

A data transmission system in an EPON includes a parser classifying frames generated in each block, and transmitting the frames to a block. A scheduler performs multiplexing of frames, then, during a transmission time permitted by an OLT, determines a transmission sequence of the frames and transmits the frames. A MPCP slave processes messages transmitted from the OLT, generates response messages on the transmitted messages, and maintains time synchronization with the OLT A processor interface conveys frames transmitted from the OLT to a processor, frames primitives transmitted from the processor, and transmits the primitives to the OLT. A register stores a value used during generation of frames in each block, a value for system control, and a value acquired from MPCP control frames.

12 Claims, 4 Drawing Sheets

OTHER PUBLICATIONS

Pesavento, Gerry et al., "IEEE Access Standards, 802.3ah GE-PON Status", presented Jul. 9-11, 2002.*

Part 3:Carrier sense multiple access with collision detection (CSMA/CD) access method and physical layer specifications, IEEE Std. 802.3, 2000 Edition.

"Draft Amendment to Carrier Sense Multiple Access with Collision Detection (CSMA/CD) access method and physical layer specifications" IEEE Draft P 802.3ah/D 1.2, Dec. 2002.

EP Search report dated Apr. 7, 2004 of the corresponding EP application No. 03027329.6 in the name of Electronics and Telecommunications Research Institute.

* cited by examiner

DATA TRANSMISSION SYSTEM AND METHOD IN EPON, AND RECORDING MEDIUM STORING PROGRAM OF THE SAME

CROSS REFERENCE TO RELATED APPLICATION

This application is based on Korea Patent Applications No. 2002-83718 filed on Dec. 24, 2002 and No. 2003-14425 filed on Mar. 7, 2003 in the Korean Intellectual Property Office, the content of which is incorporated herein by reference.

BACKGROUND OF THE INVENTION (a) Field of the Invention

The present invention relates to a data transmission system and method in an EPON, and a recording medium storing a program of the same. More particularly, the present invention relates to a data transmission system and method in an EPON, and a recording medium storing a program of the same that realizes function architecture of a MAC (medium access control) control sublayer of an ONU (optical network unit) for controlling data transmission to an OLT (optical line transmission) from an ONU or ONT (referenced only as ONU below) in an Ethernet-based PON.

(b) Description of the Related Art

At present, ADSL (asymmetric digital subscriber line) and cable modem systems are most commonly used for high-speed Internet service. The ADSL system uses telephone lines to provide high-speed Internet access. An ADSL modem is installed in a subscriber's computer, and high-speed service between 2 Mbps and 10 Mbps is possible therewith.

A cable modem system uses the coaxial cable of a local cable TV line to realize high-speed Internet service. The subscriber using this system must have a cable TV hook-up and a cable modem installed in his or her PC.

High-speed Internet services provide far faster data transmission rates of 2 Mbps_10 Mbps than a conventional system using a telephone line modem, which provides Internet access speeds of 56 Kbps. As a result, high-speed Internet services provide greater user satisfaction when surfing the Web (HTTP), sending E-mail, transmitting files (FTP), etc. However, the needs of the user are not so fully addressed when using high-speed Internet services such as VoIP (voice over Internet protocol), VoD (video on demand), Internet broadcasting, etc.

Further, with increases in the number of subscribers using the cable modem system, the bandwidth that can be used is decreasing. The problem of decreasing available bandwidth is also a problem when using the ADSL method for high-speed Internet access as a result of the increasing distances between the telephone company office and the subscriber's location.

To address these problems, FTTH (fiber to the home), FTTB (fiber to the building), and FTTC (fiber to the curb) systems are provided in which optical cables are installed that lead to homes, offices, etc. To reduce the price of such systems, much research is being performed with respect to the E-PON (Ethernet-passive optical network).

In order to make the system more price competitive, the E-PON is a network that does not utilize an active element that uses power in an optical subscriber network, and instead uses a passive element, and combines Ethernet technology.

Standards for E-PON are set forth in the IEEE (Institute of Electrical and Electronics Engineers) 802.3ah Ethernet in the First Mile Task Force.

In an E-PON, a point-to-multi-point structure is used to connect a plurality of ONUs to one OLT port through a splitter, which is a passive element.

Data is transmitted between the OLT and the ONUs through Ethernet frames, with a downstream signal from the OLT to the ONUs transmitting data through broadcasting, and an upstream signal from the ONUs to the OLT using a time division multiple access (TDMA) method so that the ONUs divide the bandwidth allocated to themselves.

FIG. 1 is a schematic view of a conventional MAC control sublayer.

As shown in FIG. 1, a conventional MAC control sublayer 20 includes a parser 21 for classifying frames transmitted from a MAC client 10, a PAUSE block 22 for generating and ending PAUSE frames, a multiplexer 23, and a demultiplexer.

The PAUSE block 22 temporarily discontinues data transmission the multiplexer 23 performs multiplexing of paused frames and frames received from the MAC client 10, and the demultiplexer classifies the paused frames.

In the MAC control sublayer 20 structured in this manner, multiplexing and transmission are performed of only frames transmitted from a bridge, which allows transmission of frames that must be relayed after distinction of MAC addresses of terminals for transmission with an external network, and of PAUSE frames.

Accordingly, since the conventional MAC control sublayer does not multiplex other control frames transmitted from the bridge for upstream frame transmission or frames transmitted from a processor, and does not support DBA (dynamic bandwidth allocation), the transmission order and time of frames from the bridge are unable to be directly controlled.

SUMMARY OF THE INVENTION

It is an advantage of the present invention to provide a data transmission system and method in an EPON, and a recording medium storing a program of the same that realizes function architecture of a MAC control sublayer of an ONU for controlling data transmission to an OLT from an ONU or an ONT in an Ethernet-based PON.

In one aspect of the present invention, a data transmission system in an Ethernet-based PON (passive optical network), for realizing a function architecture of a MAC control sublayer for an ONU (optical network unit) or ONT in an Ethernet-based PON, comprises: a parser for classifying frames generated in each block, and transmitting the frames to a corresponding block; a scheduler for multiplexing the frames then, during a transmission time permitted by an OLT, determining a transmission sequence of the frames and transmitting the frames; a MPCP slave for processing messages transmitted from the OLT, generating response messages with respect to the transmitted messages, and maintaining a designated time synchronization with the OLT; a processor interface for conveying frames transmitted from the OLT to a processor, performing framing of primitives transmitted from the processor, and transmitting the primitives to the OLT; and a register for storing a value used during generation of frames in each block, a value for system control, and a value acquired from MPCP control frames, read/write of the register values taking place through the processor interface.

The system comprises: a pause block for generating and ending pause frames, and temporarily discontinuing link transmission; and a MAC address unit for storing Ethernet physical addresses.

The parser transmits frames designated for network management and frames related to operations and maintenance (OAM) to the processor interface, MPCP control frames to the MPCP slave, pause frames to the pause block, and other frames to a bridge.

The scheduler reads frames from each block according to a designated scheduling algorithm.

The MPCP slave comprises a gate block for receiving and processing gate messages from the OLT; a discovery block for receiving and processing register and register_ack messages from the OLT and generating register_req messages; a report block for receiving queue information from a bridge and generating report messages; and a ranging block for extracting a time stamp value from the MPCP control frames and acting to maintain time synchronization with the OLT.

The scheduler performs scheduling with respect to the discovery block, the report block, the processor interface, and the interface with the bridge.

In the interface with the bridge in the scheduler, 1_9 subqueues are scheduled in orders of priorities depending on whether a time division multiplex service is received and the application number of priority queues.

In the processor interface, the frames received from the OLT are stored in a FIFO (first-in first-out) memory, and an interrupt is generated in the processor after one frame is received to enable reading by the processor, and when receiving primitives from the processor, if one primitive is completely received, the scheduler is notified that there is a frame to be transmitted such that a transmission opportunity is obtained for the next transmission time.

In another aspect of the present invention, a data transmission method in an Ethernet-based PON, for realizing a function architecture of a MAC control sublayer for an ONU or ONT in an Ethernet-based PON, comprises: (a) interfacing with a bridge and a processor in order to support connection with an external network, PON control, and operations and maintenance; (b) generating in each block frames transmitted from the bridge through (a), MPCP control frames for upstream transmission control from the PON, and OAM frames designated for network management; and (c) reading the frames generated in (b) using a designated scheduling algorithm, performing multiplexing of the frames, and transmitting the frames during a transmission time permitted by an OLT.

Interfacing with the bridge in (a) includes scheduling 1_9 subqueues in orders of priorities depending on whether a time division multiplex service is received and the application number of priority queues.

Interfacing with the bridge in (a) includes conveying frames transmitted from the OLT to the processor, framing primitives transmitted from the processor, and transmitting the primitives to the OLT.

In the generation of the MPCP control frames in (b), the MPCP control frames include pause frames, and gate, report, register_req, register, and register_ack control frames.

With respect to the MPCP control frames undergoing processing and generation in an MPCP slave, the MPCP slave comprises a gate block that processes gate messages; a discovery block that processes register and register_ack messages, and generates register_req messages; a report block that generates report messages; and a ranging block that extracts a time stamp value from the MPCP control frames and acts to maintain time synchronization with the OLT.

A value used during generation of frames in each block, a value for system control, and a value acquired from MPCP control frames are stored in (a) through (c).

In still another aspect of the present invention, a recording medium storing a program of a data transmission method in an Ethernet-based PON (passive optical network), for realizing a function architecture of a MAC control sublayer for an ONU or ONT in an Ethernet-based PON comprises: interfacing with a bridge and a processor in order to support connection with an external network, PON control, and operations and maintenance; generating in each block frames transmitted from the bridge, MPCP control frames for upstream transmission control from the PON, and OAM frames designated for network management; and reading the generated frames using a designated scheduling algorithm, performing multiplexing of the frames, and transmitting the frames during a transmission time permitted by an OLT.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
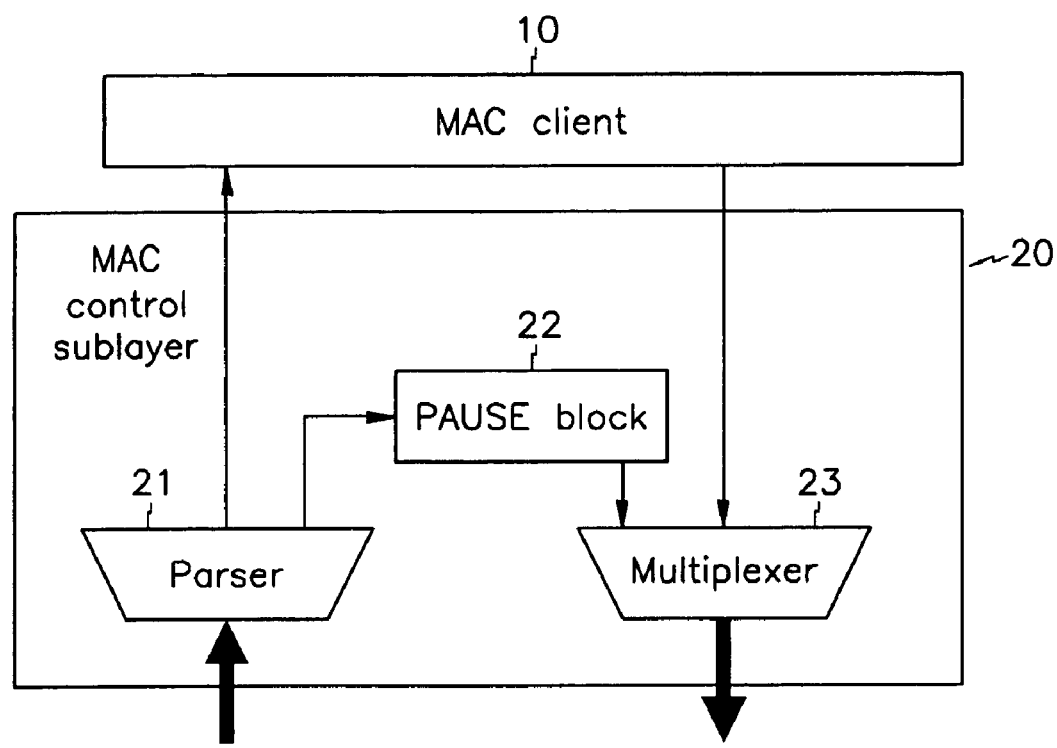
FIG. 1 is a schematic view of a conventional MAC control sublayer.
Figure 2:
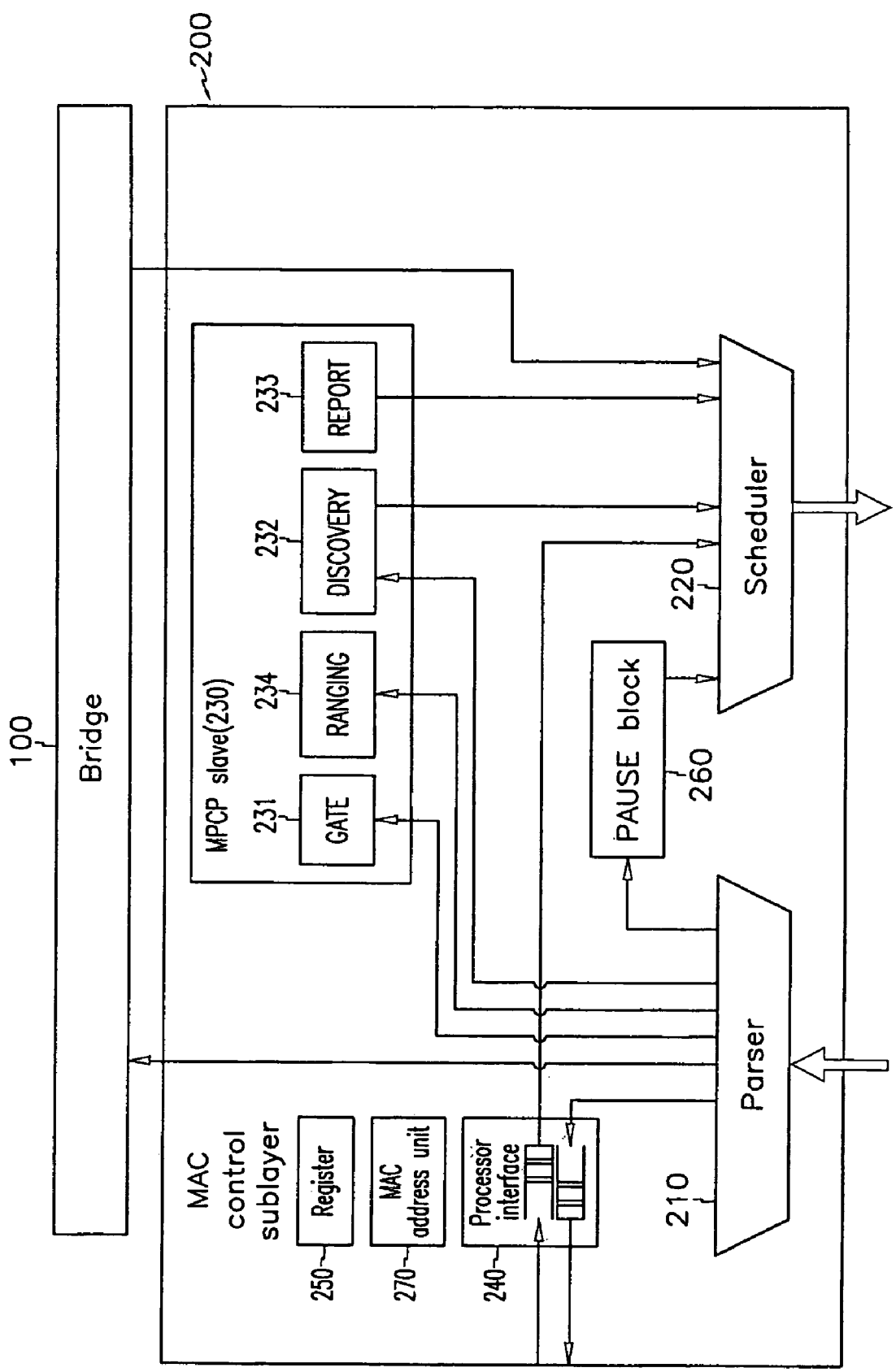
FIG. 2 is a schematic view of a data transmission system in an E-PON according to an embodiment of the present invention.

FIG. 2 is a schematic view of a data transmission system in an E-PON according to an embodiment of the present invention.

As shown in FIG. 2, a MAC control sublayer 200 according to an embodiment of the present invention includes a parser 210, a scheduler 220, a MPCP slave 230, a processor interface 240, a register 250, a PAUSE block 260, and a MAC address unit 270.

The parser 210 classifies frames generated in each block, and transmits the frames to corresponding blocks. That is, the parser 210 transmits frames designated for network management and frames related to operations and maintenance (OAM) to the processor interface 240, MPCP (multipoint control protocol) control frames to the MPCP slave 230, PAUSE frames to the PAUSE block 260, and other frames to a bridge 100.

The scheduler 220 performs multiplexing of frames, then, during a transmission time permitted by the OLT, determines a transmission sequence of the frames and transmits the same.

The MPCP slave 230 processes messages transmitted from the OLT, generates response messages with respect to the transmitted messages, and maintains designated time synchronization with the OLT.

The processor interface 240 conveys frames transmitted from the OLT to the processor, and performs framing of primitives transmitted from the processor and transmits the primitives to the OLT. The frames received from the OLT are stored in a FIFO memory, and an interrupt is generated in the processor after one frame is received to enable reading by the processor. Further, when receiving primitives from the processor, if one primitive is completely received, the scheduler 220 is notified that there is a frame to be transmitted such that a transmission opportunity is obtained for the next transmission time.

The register 250 stores a value used during generation of frames in each block, a value for system control, and a value acquired from the MPCP control frames. Read/write of the register values is possible through the processor interface 240.

Further, the PAUSE block 260 generates and ends PAUSE frames, and temporarily discontinues link transmission. The MAC address unit 270 stores physical addresses of the MAC address unit that stores Ethernet physical addresses.

The MPCP slave 230 includes a GATE block 231, a DISCOVERY block 232, a REPORT block 233, and a RANGING block 234. The GATE block 231 receives and processes GATE messages from the OLT, and the DISCOVERY block 232 receives and processes REGISTER and REGISTER_ACK messages from the OLT, and generates REGISTER_REQ messages. Further, the REPORT block 233 receives queue information from the bridge 100 and generates REPORT messages. The RANGING block 234 extracts a time stamp value from the MPCP frame and acts to maintain time synchronization with the OLT.

Among the MPCP control frames, GATE messages are transmitted to the gate block 231 of the MPCP slave 230, and the REGISTER messages are transmitted to the DISCOVERY block 232.

The scheduler 220 reads frames by the frame interface with the processor, the MPCP scheduler 230, and by a scheduling algorithm from the bridge 100, and transmits the frames during a time interval permitted by the OLT.

In the embodiment of the present invention, MPCP frames for upstream transmission control in an Ethernet-based PON are supported, and multiplexing of various frames is performed during a time interval permitted by the OLT to transmit frames upstream.

Further, interfacing with the PON bridge 100 for connection with external networks is realized, and an interface with a processor for control, operations, and maintenance of a PON is also realized.

Figure 3:
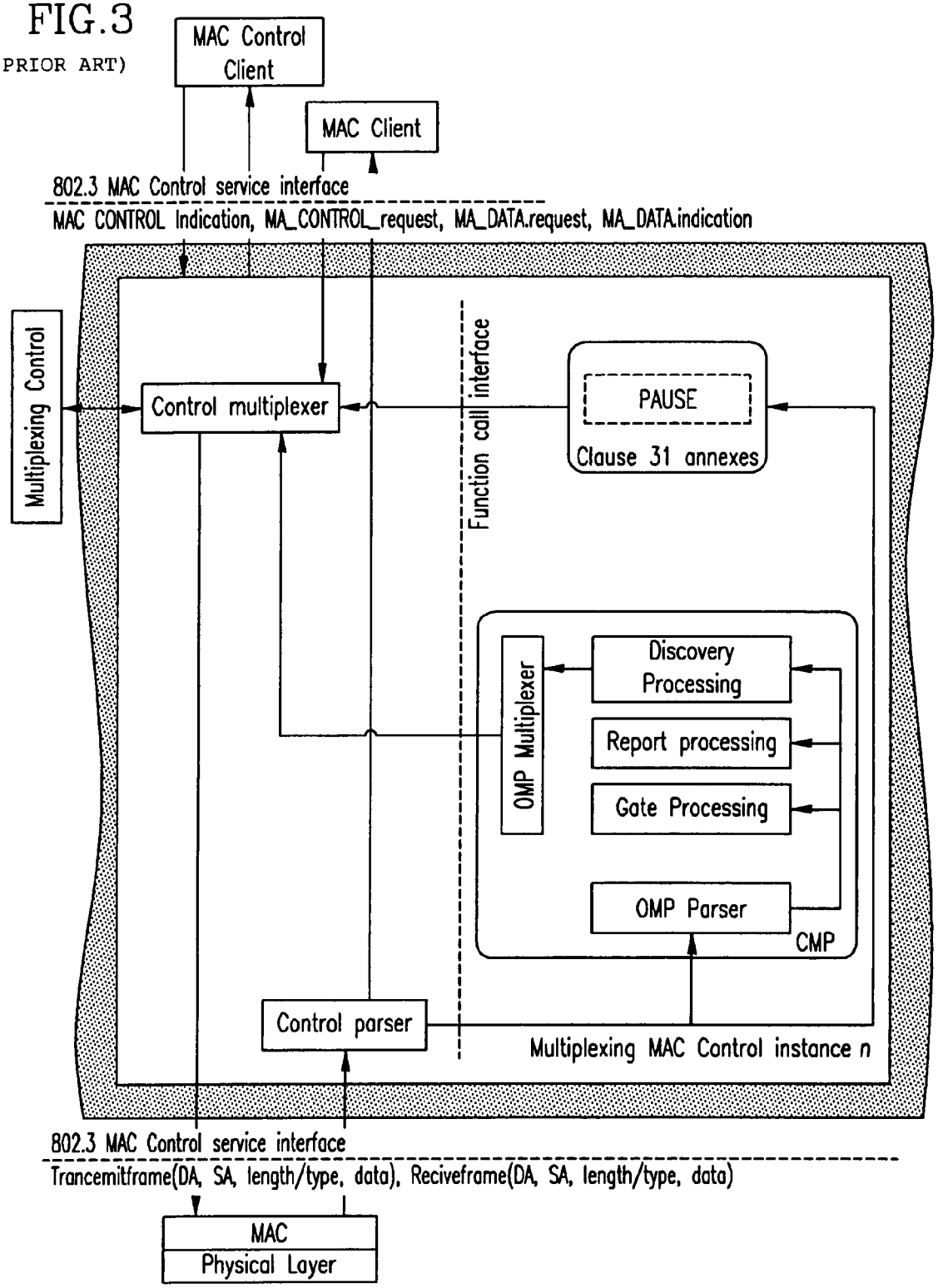
FIG. 3 is a schematic view of a MAC control sublayer of 802.3ah.

FIG. 3 is a schematic view of a MAC control sublayer in the IEEE Std. 802.3 (hereinafter referred to as 802.3). A MAC control sublayer in 802.3 supports only PAUSE frames as control frames, and the remaining frames are transmitted to an upstream bridge.

However, the MAC control sublayer of the embodiment of the present invention supports a total of 6 control frames including, in addition to PAUSE frames, GATE, REPORT, REGISTER, and REGISTER_ACK frames.

An operation of the present invention structured as in the above will now be described with reference to FIG. 4.

Figure 4:
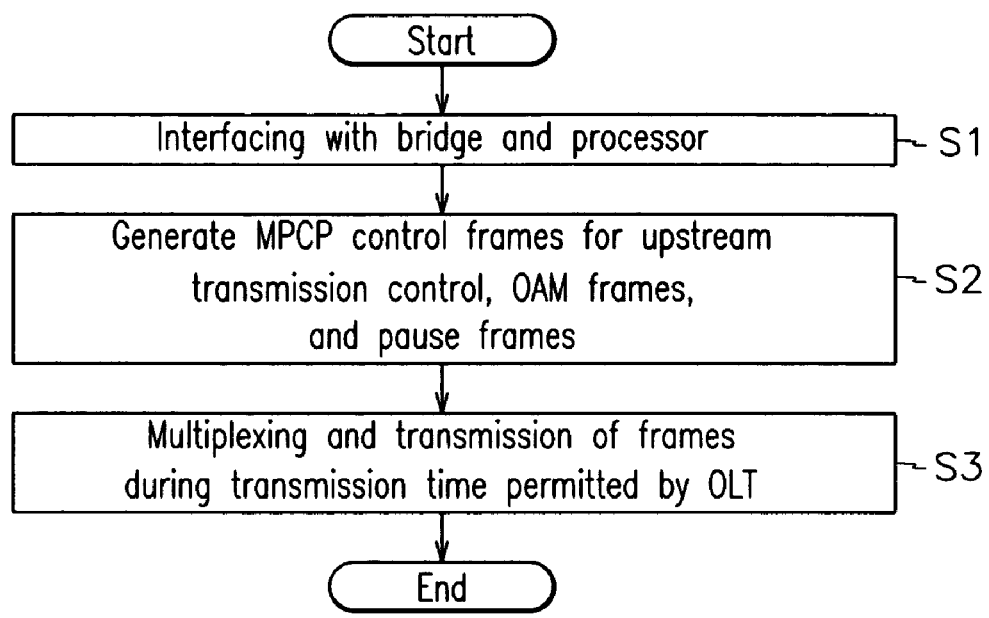
FIG. 4 is a flow chart of a data transmission method in an E-PON according to an embodiment of the present invention.

FIG. 4 is a flow chart of a data transmission method in an E-PON according to an embodiment of the present invention.

With reference to the drawing, the MAC control sublayer 200 performs interfacing with the bridge and the processor in order to support connection with an external network, PON control, and OAM in step S1.

Through such interfacing, frames transmitted from the bridge 100, MPCP control frames for upstream transmission control from the PON, and OAM frames designated for network management are generated in each block in step S2.

The scheduler 220 reads the generated frames using a scheduling algorithm, performs multiplexing of the frames, then transmits the frames during a transmission time permitted by the OLT in step S3.

In the conventional MAC control sublayer, only frames from the bridge and PAUSE frames undergo multiplexing and transmission. However, in the present invention, frames from the bridge, 6 control frames, and frames from the processor undergo multiplexing and transmission to the OLT.

Further, rather than transmitting frames from the bridge in sequence, in order to support DBA (dynamic bandwidth allocation), the scheduler 220 in the MAC control sublayer directly controls each subqueue in the bridge 100 to determine the transmission sequence and transmission time.

In the data transmission system and method in an EPON, and a recording medium storing a program of the same according to the embodiment of the present invention the MAC control sublayer for ONUs provides for frame interfacing with a bridge and processor, generates and ends MPCP control messages and classifies and multiplexes frames.

Further, the embodiment of the present invention provides an upstream transmission control mechanism for preventing upstream frame collisions of upstream frames in an Ethernet-based PON, and supports DBA to increase transmission efficiency.

Although an embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A data transmission system in an Ethernet-based passive optical network, including a MAC control sublayer for an optical network unit performing upstream frame transmission to an optical line termination in an Ethernet-based passive optical network, the MAC control sublayer comprising:

a parser for classifying frames generated in each of a plurality of blocks, and transmitting the frames to a corresponding block;

a scheduler for multiplexing the frames, then, during a transmission time permitted by the optical line termination, determining a transmission sequence of the frames and transmitting the frames, wherein the scheduler reads frames from each block according to a designated scheduling algorithm;

a multi-point control protocol slave coupled to the parser and the scheduler for processing messages transmitted from the optical line termination, generating response messages with respect to the transmitted messages, and maintaining a designated time synchronization with the optical line termination;

a processor interface coupled to the parser and the scheduler and for coupling to a processor, said processor interface for conveying frames transmitted from the optical line termination to the processor, performing framing of primitives transmitted from the processor, and transmitting the primitives to the optical line termination; and a register coupled to the processor interface for storing a value used during generation of frames in each block, a value for system control, and a value acquired from multi-point control protocol control frames, wherein the multi-point control protocol slave comprises:
a gate block for receiving and processing gate messages from the optical line termination, a discovery block for receiving and processing register and register_ack messages from the optical line termination, and generating register_req messages, a report block for receiving queue information from a bridge and generating report messages, and a ranging block for extracting a time stamp value from the multi-point control protocol slave control frames and acting to maintain time synchronization with the optical line termination, wherein the scheduler performs scheduling with respect to the discovery block, the report block, the processor interface, and a bridge.

2. The system of claim 1, comprising:

a pause block coupled to the processor interface for generating and ending pause frames, and temporarily discontinuing link transmission; and a MAC address unit coupled to the processor interface for storing Ethernet physical addresses.

3. The system as in claim 1, wherein the parser transmits frames designated for network management and frames related to operations and maintenance to the processor interface, multi-point control protocol slave control frames to the multi-point control protocol slave, pause frames to the pause block, and other frames to the bridge.

4. The system of claim 1, wherein in the interface with the bridge in the scheduler, subqueues are scheduled in orders of priorities depending on whether a time division multiplex service is received and an application dependent number of priority queues.

5. The system of claim 1, wherein in the processor interface, the frames received from the optical line termination are stored in a FIFO memory, and an interrupt is generated in the processor after one frame is received to enable reading by the processor, and when receiving primitives from the processor, if one primitive is completely received, the scheduler is notified that there is a frame to be transmitted such that a transmission opportunity is obtained for the next transmission time.

6. A data transmission method in an Ethernet-based passive optical network including a MAC control sublayer for an optical network unit performing upstream frame transmission to an optical line termination in an Ethernet-based passive optical network, the method of the MAC control sublayer comprising:

(a) interfacing with a bridge and a processor in order to support connection with an external network, passive optical network control, and operations and maintenance;

(b) generating in each of a plurality of blocks, frames transmitted from the bridge through (a), multi-point control protocol slave control frames for upstream frame transmission control from the passive optical network, and operations and maintenance frames designated for network management;

(c) reading the frames generated in (b) using a designated scheduling algorithm, performing multiplexing of the frames, and transmitting the frames during a transmission time permitted by the optical line termination;

(d) receiving and processing register and register_ack messages from the optical line termination, and generating register_req messages;

(e) receiving queue information from a bridge and generating report messages; and (f) extracting a time stamp value from the multi-point control protocol slave control frames and acting to maintain time synchronization with the optical line termination.

7. The method of claim 6, wherein interfacing with the bridge in (a) includes scheduling subqueues in orders of priorities depending on whether a time division multiplex service is received and the application dependent number of priority queues.

8. The method of claim 6, wherein interfacing with the bridge in (a) includes conveying frames transmitted from the optical line termination to the processor, framing primitives transmitted from the processor, and transmitting the primitives to the optical line termination.

9. The method of claim 6, wherein in the generation of the multi-point control protocol slave control frames in (b), the multi-point control protocol slave control frames include pause frames, and gate, report, register_req, register, and register_ack control frames.

10. The method of claim 9, wherein with respect to the multi-point control protocol slave control frames undergoing processing and generation in an multi-point control protocol slave, the multi-point control protocol slave comprises a gate block that processes gate messages; a discovery block that processes register and register_ack messages, and generates register_req messages; a report block that generates report messages; and a ranging block that extracts a time stamp value from the multi-point control protocol control frames and acts to maintain time synchronization with the optical line termination.

11. The method of claim 6, wherein a value used during generation of frames in each block, a value for system control, and a value acquired from multi-point control protocol control frames are stored.

12. A medium storing a data transmission program for use in an Ethernet-based passive optical network, including a MAC control sublayer for an optical network unit performing upstream frame transmission to an optical line termination in an Ethernet-based passive optical network, the program in the MAC control sublayer comprising:

interfacing with a bridge and a processor in order to support connection with an external network, passive optical network control, and operations and maintenance;

generating in each block frames transmitted from the bridge, multi-point control protocol slave control frames for upstream transmission control from the passive optical network, and operations and maintenance frames designated for network management;

reading the generated frames from each block using a designated scheduling algorithm, performing multiplexing of the read frames, and transmitting the multiplexed frames during a transmission time permitted by the optical line termination;

receiving and processing register and register_ack messages from the optical line termination, and generating register_req messages;

receiving queue information from a bridge and generating report messages; and extracting a time stamp value from the multi-point control protocol slave control frames and acting to maintain time synchronization with the optical line termination.

* * * * *